(12) United States Patent
Lauer et al.

(10) Patent No.: US 9,383,022 B2
(45) Date of Patent: Jul. 5, 2016

(54) SEAL FOR A DISK VALVE

(71) Applicant: Carl Freudenberg KG, Weinheim (DE)

(72) Inventors: Frank Lauer, Rauenberg (DE); Thomas Kramer, Rimbach (DE)

(73) Assignee: Carl Freudenberg KG, Weinheim (DE)

( * ) Notice: Subject to any disclaimer, the term of this patent is extended or adjusted under 35 U.S.C. 154(b) by 44 days.

(21) Appl. No.: 14/371,007

(22) PCT Filed: Oct. 25, 2012

(86) PCT No.: PCT/EP2012/004464
§ 371 (c)(1),
(2) Date: Jul. 8, 2014

(87) PCT Pub. No.: WO2013/104380
PCT Pub. Date: Jul. 18, 2013

(65) Prior Publication Data
US 2014/0374997 A1 Dec. 25, 2014

(30) Foreign Application Priority Data
Jan. 10, 2012 (DE) .......................... 10 2012 000 257

(51) Int. Cl.
*F16K 1/226* (2006.01)
*F16K 1/46* (2006.01)

(52) U.S. Cl.
CPC ................. *F16K 1/46* (2013.01); *F16K 1/2265* (2013.01); *F16K 1/2268* (2013.01)

(58) Field of Classification Search
CPC ..... F16K 1/226; F16K 1/2263; F16K 1/2265; F16K 1/2268
See application file for complete search history.

(56) References Cited

U.S. PATENT DOCUMENTS

| 2,911,184 | A |  | 11/1959 | Moore |  |
|---|---|---|---|---|---|
| 3,129,920 | A |  | 4/1964 | Stillwagon |  |
| 3,473,784 | A | * | 10/1969 | Radford | F16K 1/2265 251/148 |
| 3,656,712 | A | * | 4/1972 | Bertrem | F16K 1/2265 251/306 |
| 3,675,677 | A | * | 7/1972 | Scaramucci | F16K 1/2265 137/375 |
| 3,776,509 | A | * | 12/1973 | Leblond | F16K 1/2268 251/306 |
| 4,214,731 | A | * | 7/1980 | Oota | F16K 1/2265 251/306 |
| 4,653,724 | A | * | 3/1987 | Garrigues | F16K 1/2265 251/152 |
| 5,482,252 | A | * | 1/1996 | Kamezawa | F16K 1/2268 251/305 |
| 2003/0178596 | A1 |  | 9/2003 | Gomi et al. |  |

FOREIGN PATENT DOCUMENTS

| CN | 1650124 | A | 8/2005 |
|---|---|---|---|
| DE | 2801049 | A1 | 10/1978 |
| DE | 2843833 | A1 | 4/1980 |
| DE | 29521400 | U1 | 3/1997 |
| DE | 102007016240 | A1 | 10/2008 |
| EP | 0707167 | A1 | 4/1996 |
| EP | 1813842 | A1 | 8/2007 |
| FR | 1522379 | A | 4/1968 |
| GB | 1288861 | A | 9/1972 |

(Continued)

*Primary Examiner* — Gilbert Lee
(74) *Attorney, Agent, or Firm* — Fraser Clemens Martin & Miller LLC; James D. Miller

(57) ABSTRACT

The invention relates to a seal on a disk valve, in which a sealing collar consisting of elastomeric material is used for both the static flange seals and the dynamic seals on the valve disk and on the switching pin, the sealing function of the static flange seals (14) being separate from the sealing function of the dynamic disk seal.

19 Claims, 8 Drawing Sheets

(56) References Cited

FOREIGN PATENT DOCUMENTS

| | | |
|---|---|---|
| GB | 2033057 A | 5/1980 |
| GB | 2033058 A | 5/1980 |
| GB | 2303901 A | 3/1997 |
| GB | 2352018 A | 1/2001 |
| WO | 2004088184 A1 | 10/2004 |
| WO | 2008131090 A1 | 10/2008 |

* cited by examiner

SEAL FOR A DISK VALVE

CROSS-REFERENCE TO RELATED APPLICATION

This application is U.S. National Phase Application based on International PCT/EP2012/004464 filed Oct. 25, 2012 and also claims priority to German Patent Application Serial No. DE 10 2012 000 257.2 filed Jan. 10, 2012, hereby incorporated herein by reference in its entirety.

TECHNICAL FIELD

The invention relates to a seal on a disk valve, also referred to as a flap valve, which serves for controlling the passage of liquids through pipeline systems, in particular in the beverage and food industry.

Valves of this type are very commonly composed of a flange connection with a valve flap and a sealing collar composed of an elastomer material, which sealing collar is provided both for the static flange seal and for the dynamic seals at the valve disk and at the switching shaft. Here, the sealing collar performs all three sealing functions and additionally prevents an infiltration of the liquid behind the sealing collar. Here, a compromise is reached between leak-tightness, service life and the switching forces on the switching shaft. The sealing collar is compressed axially by flanges, whereby both the static seal at the flanges and the dynamic seals at the valve disk and at the switching shaft are predefined. It is a disadvantage here that, as the flanges are pulled together, all four sealing functions are realized simultaneously. There is also the risk of the sealing collar being torn out of its holder.

PRIOR ART

EP 1 813 842 A1 presents a disk valve having a sealing collar which is of substantially elliptical form, such that the friction and the wear in the region of the transverse passages are reduced. The service life of the valve is increased, this also resulting from a homogenization of the contact pressure over the entire circumference of the transverse shaft mounting.

PRESENTATION OF THE INVENTION

The invention is based on the object of providing a seal which has a long service life with excellent sealing functions. It is the intention for said seal to be manufactured with relatively small tolerances and to be inserted securely into its holder. Furthermore, it is also sought to achieve a reduction in torque at the switching shaft.

The stated object is achieved by means of the features of claim 1. The subclaims define further advantageous embodiments of the concept of the invention.

The underlying concept of the present invention can be seen in the fact that a separation of the sealing functions is realized. In this way, it is possible for the sealing functions to be optimized independently of one another. It is accordingly possible for the sealing function of the static flange seal to be performed separately from the sealing function of the dynamic disk seal. This permits fixed, static clamping of the seal, which makes it impossible for said seal to be torn out. Furthermore, the seal can be arranged such that displacement chambers are formed which can accommodate manufacturing tolerances and thermal expansions. In addition to this, it is for example also possible for self-centering of the seal and of the flange seal to be realized.

In a further embodiment of the concept of the invention, the sealing functions at the dynamic switching shaft seals may likewise be performed separately from the sealing functions of the static flange seal and of the dynamic disk seal.

In terms of the structural design of the valve flap, the well-known construction thereof is maintained. Here, the valve flap and the switching shaft form a unit and are manufactured from metal. At the switching shaft leadthroughs, the valve flap is provided with a sealing contour or thickening.

In its simplest embodiment, the sealing collar is formed from a central part for the dynamic disk seal and of radially outwardly projecting annular margins, which adjoin the central part via hinge-like transitions, for the static flange seal. There is inserted into the sealing collar a supporting ring which surrounds the sealing collar and which bears by way of its outer edge against the annular margins and which, by way of its inner surface, supports the central part of the sealing collar. By means of the inserted supporting ring, it is possible, as the flanges are pulled together, for a static flange seal to be realized by virtue of the annular margins being pressed together against the supporting ring, which static flange seal is independent of the dynamic seals at the valve disk and at the switching shaft. The hinge-like transition is formed such that, as the annular margins of the sealing collar are pressed together, no force flow is transmitted to the central part of the sealing collar. The central part of the sealing collar itself is supported on the inner surface of the supporting ring.

Through the selection of corresponding material, but in particular the selection of the height of the central part, that is to say the distance between the dynamic sealing surface of the central part and the inner surface of the supporting ring, the sealing force of said central part is determined. It is the case here, too, that the sealing forces that arise here are prevented from acting on the static flange seal by the transitions from the central part to the projecting annular margins.

The preferred embodiment of the invention provides a design of the sealing collar in which annular-groove-like depressions are formed between the central part and the respective annular margins of the sealing collar. Annular supports of the supporting ring are inserted into said depressions, wherein the supporting ring is designed correspondingly. Said supporting ring, on its outer edges, has inwardly pointing annular supports which are matched in terms of their shape to the shape of the depressions in the sealing collar. When the supporting ring is inserted into the sealing collar, the annular supports bear by way of their axial outer surfaces against the axial inner surfaces of the annular margins of the sealing collar and form the counter supports for the static flange seal. As is also the case in the simple embodiment above, the flanges themselves are tapered inwardly slightly in conical fashion at their surfaces situated opposite the ring or the annular supports. The central part of the sealing collar is inserted between the annular supports. Here, the axial inner surfaces of the annular supports bear against the axial outer surfaces of the central part. Here, too, the central part bears against the inner surface of the supporting ring. In all embodiments, it is an advantage here that the central part has a radially outwardly arched outer surface. It is expedient here for said outer surface to be provided with a section which is of planar form and which comes to bear against the inner base of the supporting ring. The dynamic disk seal is configured in terms of its action primarily by means of the selected thickness of the central part in its planar section.

It is furthermore advantageous for the annular margins of the sealing collar to be of bead-like form at their radially outer end parts. Said end parts project into grooves that are formed in the axial wall surfaces of the flanges, wherein the end parts are provided with undercuts by which they come to bear against the radially inner groove walls of the flanges. In this way, the sealing collar is secured, so as to be prevented from being torn out, in a highly effective manner. Furthermore, it is possible for compensation zones for thermally induced expansions of the end parts to be accommodated in the free corners between the end parts and the groove walls.

The switching shaft of the valve disk is held in coaxial, oppositely situated openings in the supporting ring. Here, the shaft is encompassed, and sealed off, by the central part of the collar. Said seal is realized by means of a socket formed on the sealing collar, which socket engages around the switching shaft and on the inner surfaces of which socket there are formed sealing contours. The socket bears by way of its axial outer surface against the base of the supporting ring.

The decoupling of all three sealing functions—the static seal at the flanges and the dynamic seals at the valve disk and at the switching shaft—is achieved by means of decoupling bushings which are inserted into annular grooves in the sockets. Said sockets are situated such that their end surfaces in the regions of the sealing surfaces are between the central part of the sealing collar and the sealing beads on the switching shafts. The sockets are accommodated and arranged in the annular grooves such that the resultant forces from the switching shaft seals have a point of intersection in a radial and in an axial direction, which point of intersection lies within the socket wall. In this way, it is possible for the forces present at the switching shaft seals to be isolated from the dynamic seals at the sealing collar and from the static seals at the flanges. Consequently, in this embodiment, all of the sealing functions in a flange connection of a disk valve can be set entirely separately from one another.

To achieve good guidance of the switching shaft, it is expedient for the switching shaft to be held by guide bushings. Said guide bushings may for example be jointly inserted into the decoupling bushings.

It is furthermore advantageous for the supporting ring to be divided centrally. Said division may for example be perpendicular to the plane of the ring such that two ring halves are formed. It is however preferable for the supporting ring to be divided centrally in its ring plane. Here, the shaft mounting is severed in the center, which is advantageous with regard to assembly. If appropriate, the sockets and/or guide bushings may also be composed of two halves. For the centering of the divided partial supporting rings, an overlapping guide is provided in the parting plane, which guide is composed of a projecting ring part on one partial supporting ring and of a corresponding annular receptacle for the ring part on the other partial supporting ring. When placed together, the partial rings are flush with one another. This also has an expedient effect with regard to the flanges, which are likewise centered when they are pushed onto the seal.

BRIEF DESCRIPTION OF THE DRAWINGS

The invention will be explained in more detail below on the basis of the exemplary embodiments illustrated in the drawing, in which.

EMBODIMENT OF THE INVENTION

Figure 1:
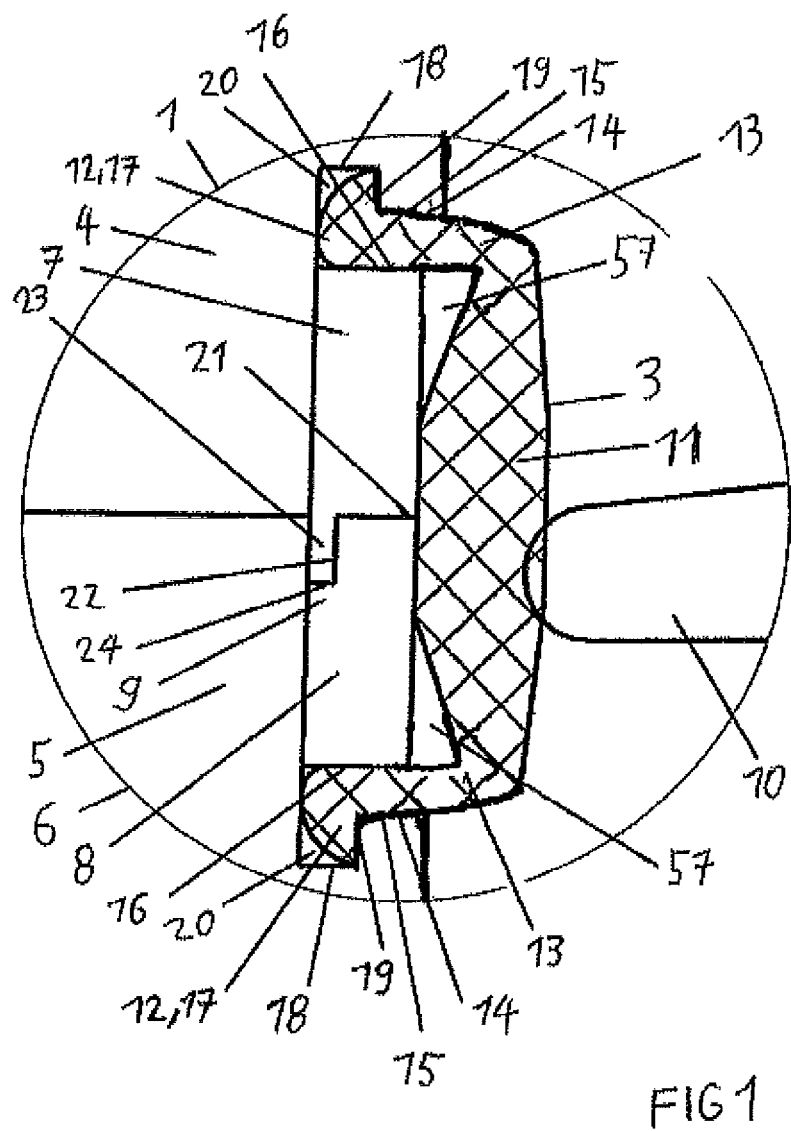
FIG. 1 shows a longitudinal section through one side of the seal in its basic simple embodiment, in which, with a single sealing collar being used, the static flange seal is independent of the dynamic seals at the disk and at the switching shaft.

FIG. 1 schematically shows a section through the seal arrangement 1 which is composed of the sealing collar 3, the flanges 4 and 5 of the flange connection 6, the partial supporting rings 7 and 8 of the supporting ring 9, and the valve flap 10. The sealing collar 3 is composed of the central part 11 and of the radially outwardly projecting annular margins 12 which are connected to the central part 11 via the hinge-like transitions 13. At the annular margins 12, the static flange seals 14 are realized by virtue of the surfaces 15, which taper inwardly slightly in conical fashion, of the flanges 4 and 5 pressing the annular margins 12 against the outer edges 16 of the supporting ring 9. The annular margins 12 are of bead-like form at their radially outer end parts 17. Said end parts 17 are situated in the grooves 18 that are formed in the wall surfaces 5 of the flanges 4, 5. The end parts 17 have the undercuts 19 by which said end parts bear against the radially inner groove walls of the flanges 4, 5. The free corners 20 between the end parts 17 and the groove walls form compensation zones for thermally induced expansions of the end parts 17. The partial supporting rings 7, 8 have, in the parting plane 21, an overlapping guide 22 causing the partial supporting rings 7, 8 and the flanges 4, 5 to be centered. The guide 22 is composed of the projecting ring part 23 on the partial supporting ring 7 and the corresponding annular receptacle 24 for the ring part 23 on the partial supporting ring 8. In this embodiment of the seal, the static flange seals 14 are separate from the dynamic seals at the valve disk 10 and at the switching shaft. The flange seal 14 simultaneously has the effect that liquid is reliably prevented from infiltrating behind. Between the sealing collar 3 and the partial supporting ring 7, 8 there are provided compensation chambers 57 for the sealing collar 3, which is particularly advantageous.

Figure 2:
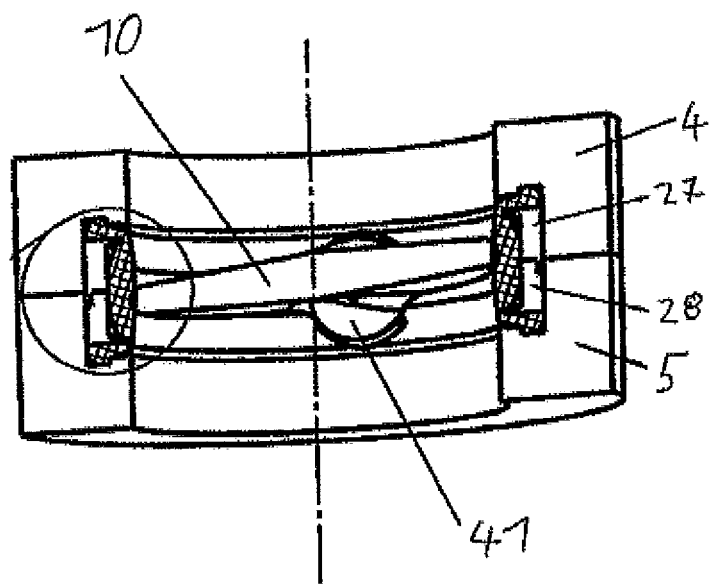
FIG. 2 and FIG. 3 show an embodiment in which the seal has a supporting ring with annular supports.
Figure 3:
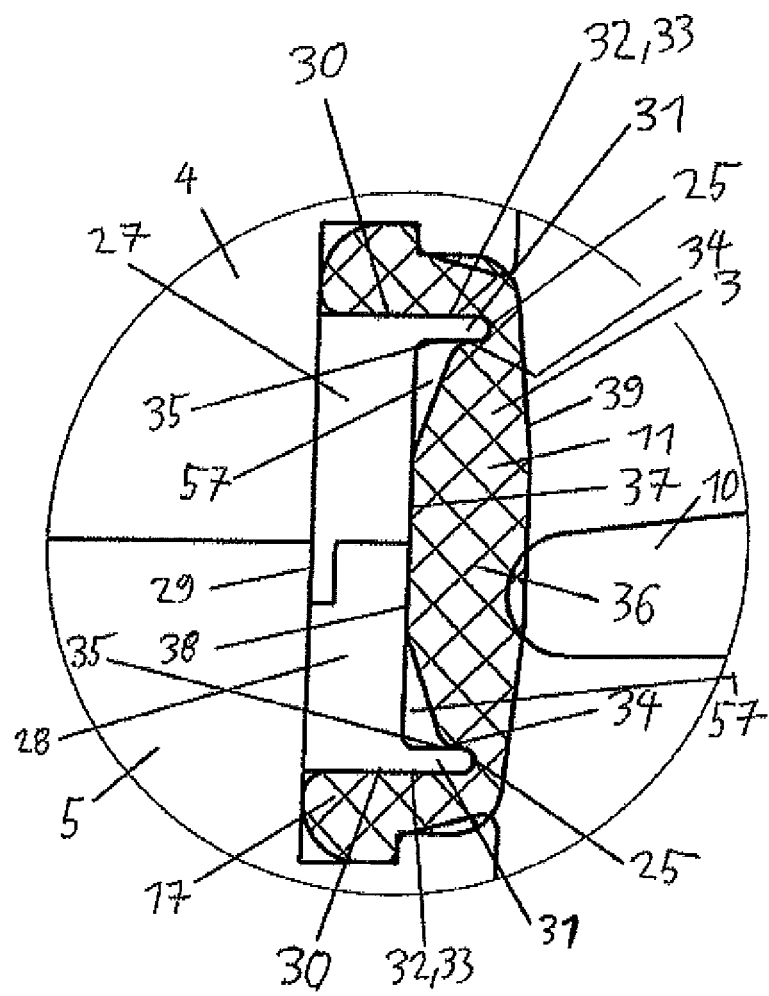
Figure 4:
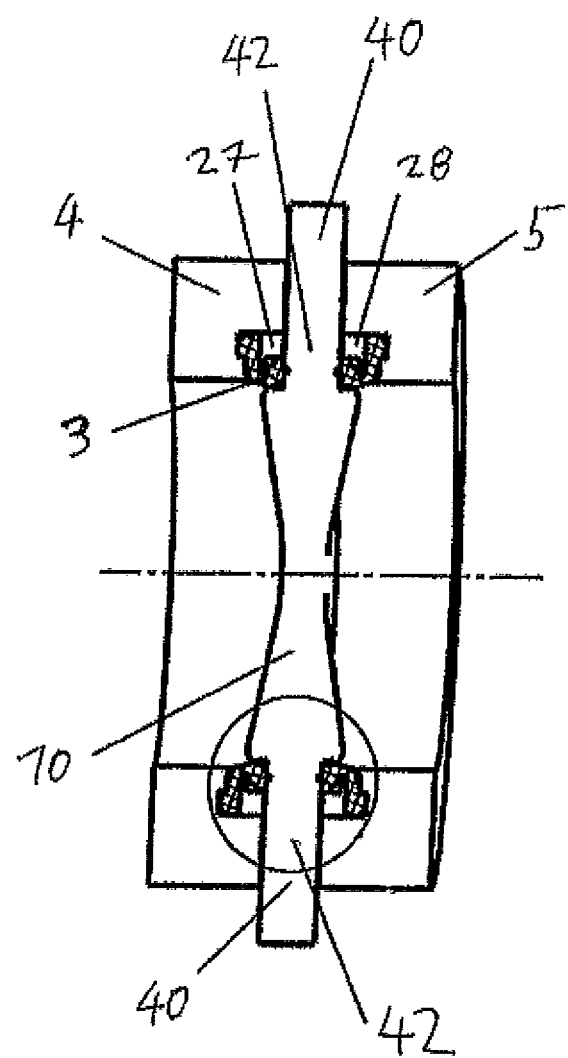
FIG. 4 and FIG. 5 show the switching shaft seal of a seal embodiment as per FIGS. 2 and 3.

FIGS. 2 and 3 show the sealing collar 3 in which groove-like depressions 25 are provided between the central part 11 and the respective annular margins 12. The sealing collar 3 is likewise surrounded by a metallic supporting ring 29 which is composed of the partial supporting rings 27, 28. The supporting ring 29 has, on its outer edges 30, annular supports 31 which engage into the depressions 25 of the sealing collar 3. The annular supports 31 bear by way of their axial outer surfaces 32 against the axial inner surfaces 33 of the annular margins 12 of the sealing collar 3. By means of said annular supports 31, the static flange seal 14 is generated when the flanges 4 and 5 are pressed together. The conically tapering part of the flanges 4, 5 is situated opposite the annular supports 31. The axial outer surfaces 34 of the central part 11 bear against the axial inner surfaces 35 of the annular supports 31. By means of this embodiment, it is possible to realize an enlarged sealing surface at the static seals 14. It is likewise possible for the end parts 17 to be designed to be larger. In the same way as in the exemplary embodiment as per FIG. 1, the central part 11 of the sealing collar 3 has a radially outwardly arched outer surface 39. Said outer surface 39 is provided with the section 37 of planar form. The latter bears against the inner base 38 of the supporting ring 29. The dynamic disk seal is configured in terms of its action by means of the selected thickness 36 of the central part 11 in the planar section 37.

In all embodiments, the valve flap 10 and the switching shaft 40 are a unit produced from metal. The valve flap 10 has a spherical-cap-shaped sealing contour 41 at the switching shaft leadthroughs. The switching shaft 40 is, in a manner known per se, held in coaxial, oppositely situated openings 42 in the supporting ring 9 or 29.

Figure 5:
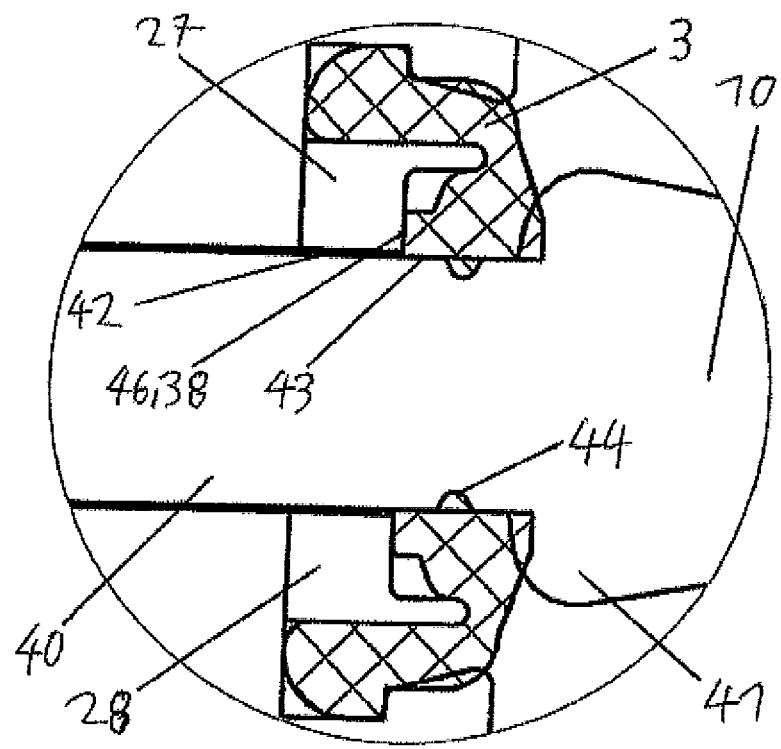
Figure 6:
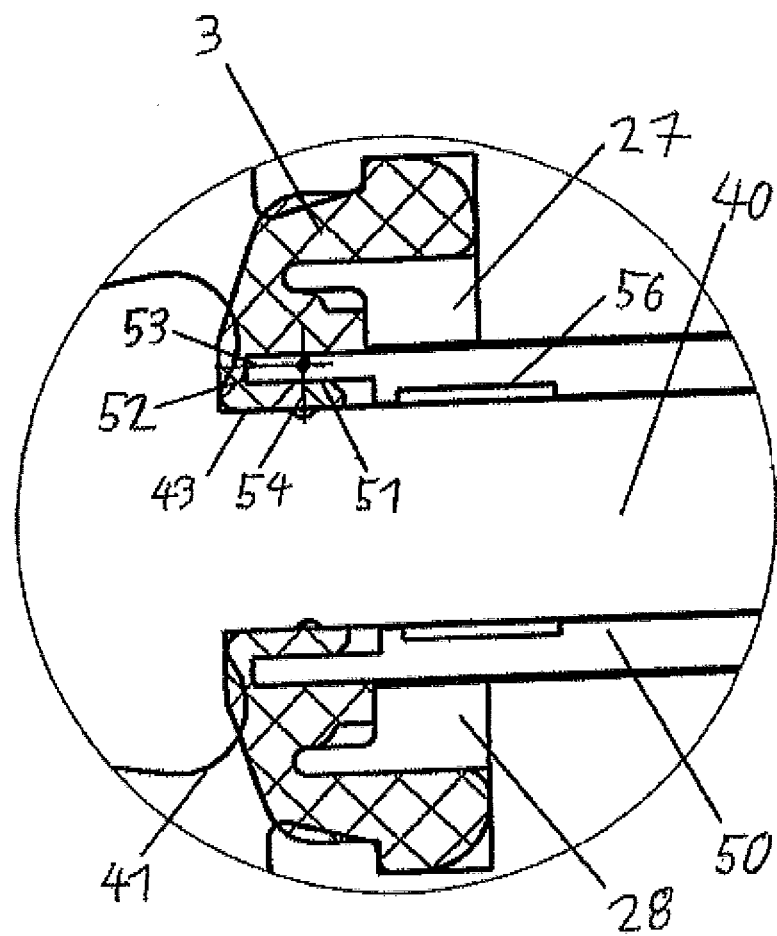
FIG. 6 shows a switching shaft seal with decoupling bushing.

FIG. 5 shows a section through the seal of the switching shaft 40. Here, the sealing collar 3 has a molded protuberance 43 which engages around the switching shaft 40 and the inner surface of which is provided with the sealing bead 44. The molded protuberance 43 bears by way of its axial outer surface 46 against the base 38 of the supporting ring 9 or 29. The oppositely situated opening for the switching shaft 40 is of a similar construction with regard to the sealing function FIG. 6 shows an embodiment in which the switching shaft seal is also realized separately, in terms of its force flow, from the dynamic disk seal. Here, a decoupling bushing 50 is inserted into the molded protuberance 43 of the sealing collar 3, specifically into the annular groove 51 that has been formed into the molded protuberance 43 of the sealing collar 3. By way of its projecting end 52, the decoupling bushing 50 is situated in the sealing region between the central part 11 of the sealing collar 3 and the sealing contour 41. By means of said arrangement, it is possible for the resultant forces 53 and 54 of the dynamic seals at the switching shaft 40 to be aligned such that their point of intersection lies on the decoupling bushing 50. This permits a separate configuration both of the seal at the switching shaft 40 and between the sealing contour 41 and the central part 11 of the sealing collar 3.

Finally, it is also possible for a guide bushing 56 to be inserted into the decoupling bushing 50, which guide bushing improves the rotatability of the switching shaft 10. For easy assembly, both bushings 50 and 56 may also be divided, in their central plane, into two halves.

Figure 7A:
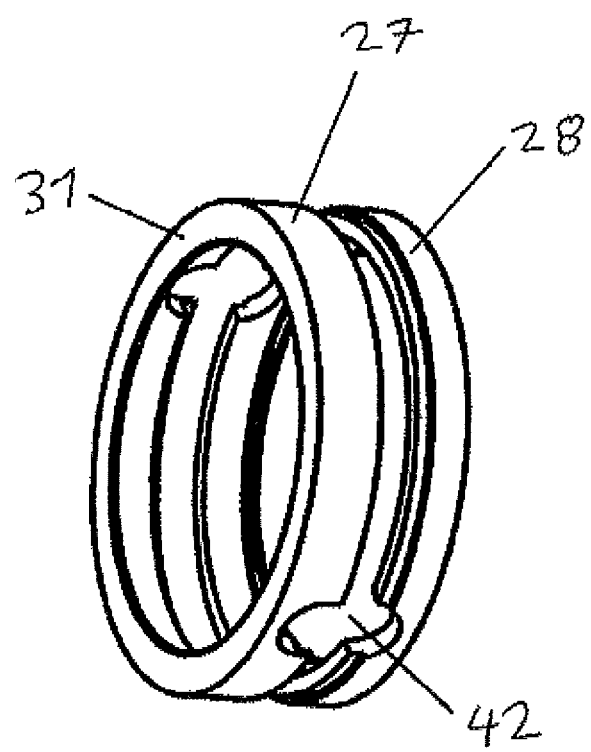
FIGS. 7a and 7b show a divided supporting ring in a perspective view and in section.
Figure 7B:
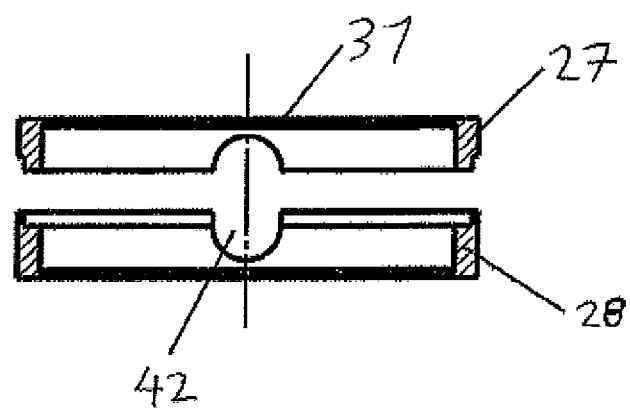

FIGS. 7a and 7b illustrate a supporting ring 29 that has been divided, in its central plane, into two partial supporting rings 27, 28.

The invention claimed is:

1. A seal for a disk valve comprising:
a sealing collar configured to provide both a static seal with a flange connection of the disk valve and a dynamic seal with a valve flap of the disk valve and with a switching shaft of the disk valve, wherein the static seal with the flange connection is separate from at least one of the dynamic seal of the valve flap of the disk valve and the dynamic seal with the switching shaft of the disk valve, wherein the sealing collar includes a central part and radially outwardly projecting annular margins adjoining the central part by hinge-like transitions, the central part providing the dynamic seal and the annular margins providing the static seal.

2. The seal of claim 1, wherein the valve flap and the switching shaft are formed of a unitary structure.

3. The seal of claim 1, wherein the valve flap and the switching shaft are foamed from metal.

4. The seal of claim 1, wherein the sealing collar is formed from an elastomer.

5. The seal of claim 1, wherein the valve flap has a sealing contour formed thereon configured to abut the sealing collar.

6. The seal of claim 1, further comprising a supporting ring coupled to and surrounding the sealing collar, wherein the supporting ring abuts the annular margins and supports the central part of the sealing collar.

7. The seal of claim 6, wherein the switching shaft of the valve disk is disposed in coaxial, oppositely situated openings formed in the supporting ring.

8. The seal of claim 1, wherein annular-groove-like depressions are provided between the central part and the annular margins of the sealing collar.

9. The seal of claim 8, further comprising a supporting ring coupled to and surrounding the sealing collar, wherein the supporting ring abuts the annular margins and supports the central part of the sealing collar, and wherein outer edges of the supporting ring include radially inwardly pointing annular supports received in the depressions of the sealing collar.

10. The seal of claim 9, wherein outer surfaces of the annular supports abut inner surfaces of the annular margins of the sealing collar to provide the static seal.

11. The seal of claim 10, wherein flanges of the flange connection taper inwardly in a substantially conical fashion on surfaces thereof opposite the outer surfaces of the annular supports.

12. The seal of claim 9, wherein the central part includes a radially outwardly arched outer surface, and wherein cavities are formed between a base of the supporting ring and the outer surface of the central part to accommodate at least one of mechanical expansion and thermal expansion of the central part.

13. The seal of claim 9, wherein the supporting ring is formed from two partial supporting rings.

14. The seal of claim 13, wherein the partial supporting rings include an overlapping guide causing the partial supporting rings to be centered relative to one another.

15. The seal of claim 14, wherein the overlapping guide includes a projecting ring part on a first one of the partial supporting rings and a corresponding annular receptacle for receiving the projecting ring part on a second one of the partial supporting rings.

16. The seal of claim 1, wherein grooves for receiving the annular margins are formed in the flange connection.

17. The seal of claim 16, wherein the annular margins include end parts having undercuts abutting walls forming the grooves of the flange connection.

18. The seal of claim 1, wherein protuberances are provided on the central part, the protuberances having annular grooves formed therein configured to receive decoupling bushings.

19. The seal of claim 18, wherein the switching shaft is held by guide bushings inserted into the decoupling bushings.

\* \* \* \* \*